(12) United States Patent
Wu et al.

(10) Patent No.: US 10,487,866 B2
(45) Date of Patent: *Nov. 26, 2019

(54) FASTENING DEVICE (71) Applicant: HANWIT PRECISION INDUSTRIES LTD., New Taipei (TW)

(72) Inventors: Ming-De Wu, New Taipei (TW); Ching-Kai Chang, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 221 days.

This patent is subject to a terminal disclaimer.

(21) Appl. No.: 15/632,699

(22) Filed: Jun. 26, 2017

(65) Prior Publication Data

US 2018/0202482 A1 Jul. 19, 2018

Related U.S. Application Data

(63) Continuation-in-part of application No. 15/409,376, filed on Jan. 18, 2017, now Pat. No. 10,132,345.

(51) Int. Cl.
*F16B 21/00* (2006.01)
*F16B 19/10* (2006.01)
*F16B 5/02* (2006.01)

(52) U.S. Cl.
CPC .......... *F16B 19/109* (2013.01); *F16B 5/0208* (2013.01)

(58) Field of Classification Search
CPC ................................ F16B 21/02; F16B 5/0888
USPC ........................................................ 411/549
See application file for complete search history.

(56) References Cited

U.S. PATENT DOCUMENTS

| 2,907,418 | A | * | 10/1959 | Hudson | F16B 5/0208 403/21 |
| 4,616,967 | A | * | 10/1986 | Molina | F16B 41/002 411/105 |
| 5,769,118 | A | * | 6/1998 | Lenberg | F16K 31/60 116/277 |
| 8,657,545 | B2 | * | 2/2014 | Magno, Jr. | F16B 7/187 248/214 |
| 2011/0070049 | A1 | * | 3/2011 | Wang | F16B 5/0208 411/372.6 |

* cited by examiner

*Primary Examiner* — Gary W Estremsky
(74) *Attorney, Agent, or Firm* — Muncy, Geissler, Olds & Lowe, PC (57) ABSTRACT

The present disclosure illustrates a fastening device. In the fastening device, a sleeve is formed with a through-hole which defines a rotation space, a position-limiting ring is formed on the sleeve and includes a first position-limiting fastening groove and two second position-limiting fastening grooves; a fastening member is formed on a bottom surface of a rod head of a rotary knob device dispose outside the sleeve; a long protrusion rod and two short protrusion rods are formed in the sliding inner hole of the assembly space and respectively aligned with the first position-limiting fastening groove and the two second position-limiting fastening grooves. During locking operation, the drive cap can be bi-directionally rotated; and during unlocking operation, the drive cap can only be unidirectionally rotate, thereby achieving the purpose of easily recognize the locked or unlocked state according to different hand feeling in operation.

8 Claims, 12 Drawing Sheets

FASTENING DEVICE

This application is a Continuation-In-Part of application Ser. No. 15/409,376, filed on Jan. 18, 2017, for which priority is claimed under 35 U.S.C. § 120, the entire contents of which are hereby incorporated by reference.

BACKGROUND OF THE INVENTION

1. Field of the Invention

The present disclosure relates to a fastening device, more particularly to a fastening device in which a drive cap disposed outside a sleeve can be pressed down to bi-directionally rotate to drive a rotary knob device inside the sleeve to perform a locking operation; in the other hand, in order to unlock the rotary knob device, the drive cap can only be unidirectionally rotate in a reverse direction. As a result, the user can determine whether the fastening device is in the locked state or the unlocked state according to hand feeling of rotating the fastening device, so as to achieve a purpose of intuitional, simple and quick operation.

2. Description of the Related Art

Conventionally, in order to assemble or combine two plates (that is, plate-to-plate connection), a fastening screw having a knob, a collar and a screw is usually used to lock the two plates. The screw and the collar are fastened on a first plate, and the knob is then rotated to insert the screw into a second plate for pre-positioning, and the user then can lock the screw tightly by using hand tools, thereby locking the first and second plates integrally. Aforesaid way of plate-to-plate connection can be used to assemble a plurality of devices or mechanisms to construct equipment, such as telecommunications cabinet, industrial computer or machine tool.

Figure 9:
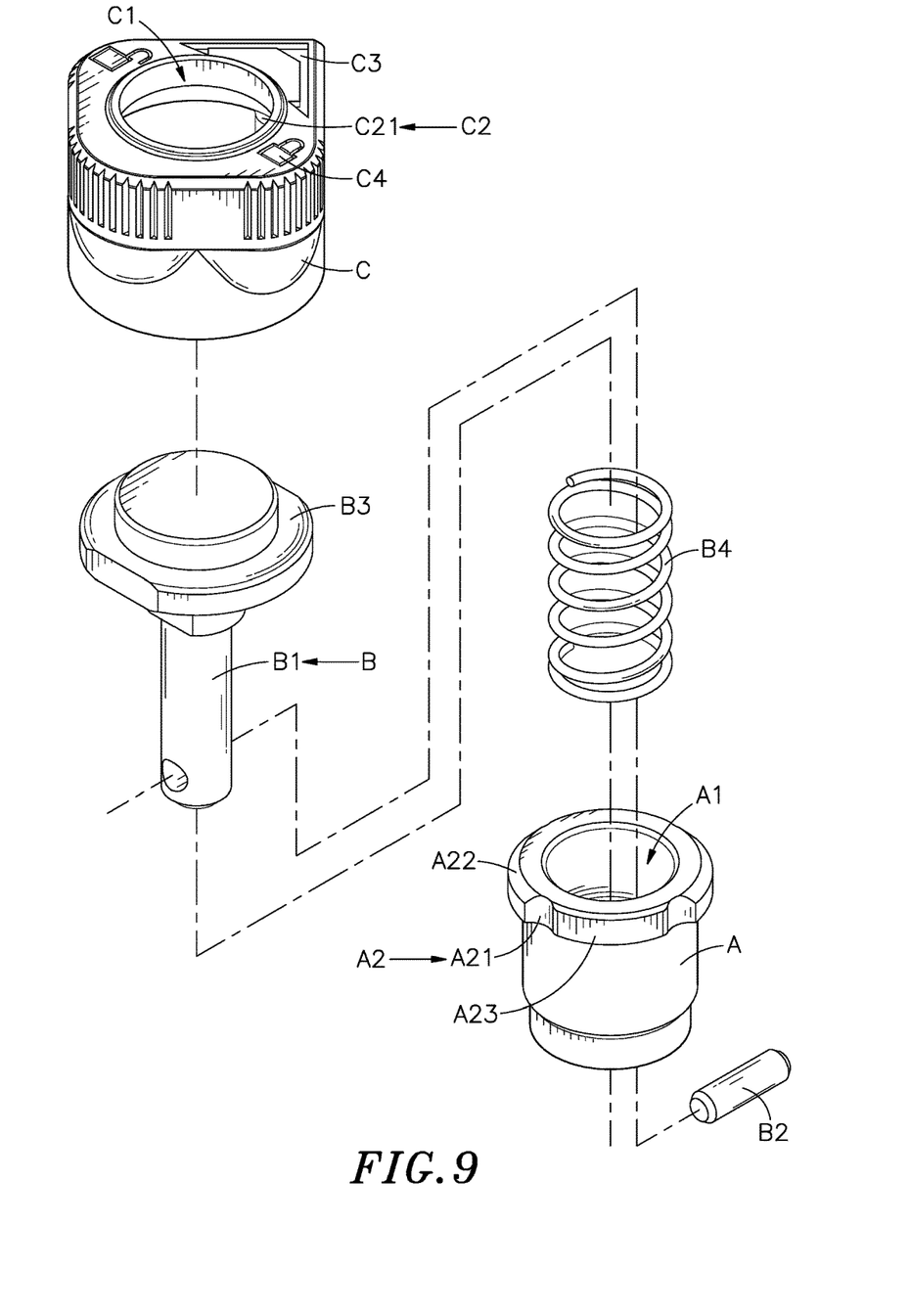
FIG. 9 is an exploded view of a conventional fastening device of the parent application Ser. No. 15/409,376.
Figure 10:
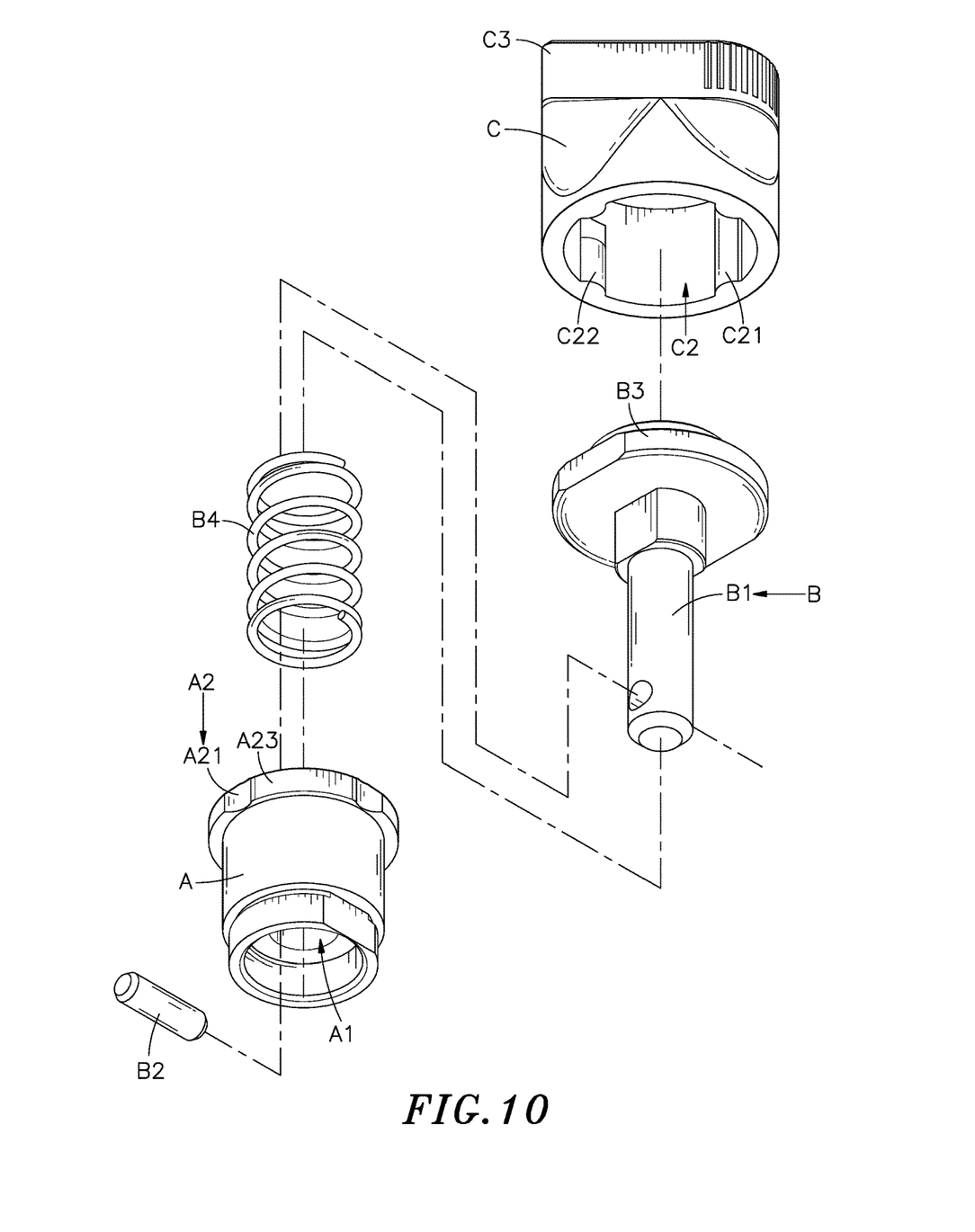
FIG. 10 is an exploded view of the fastening device of the parent application Ser. No. 15/409,376, when viewed from another angle.

However, if a user forgets to carry suitable hand tools, entire detachment operation may be affected, so a manufacturer develops a fastening device, and the user can rotate this fastening device by hand to fasten or separate the plates. The following refers to FIGS. 9 and 10. As shown in FIGS. 9 and 10, a sleeve A includes a through hole A1 cut therethrough, and a position-limiting ring A2 protruded at an outer edge of a top thereof. The position-limiting ring A2 includes a plurality of grooves A21 cut through an edge surface thereof and arranged in interval, and includes two first ring edges A22 respectively formed between any two adjacent grooves A21 and having extended outer diameters, and two second ring edges A23 having reduced outer diameter and arranged in an interlaced arrangement with the two first ring edges A22. A rotary rod B1 of a rotary knob device B is inserted through the through hole A1. The rotary knob device B includes a rotation pin B2 cut through a bottom part of the rotary rod B1, and a rod head B3 formed at a top thereof and exposed out of the sleeve A. An elastic member B4 is mounted on the rotary rod B1 and abutted with an inner wall of the through hole A1, and the rotary knob device B is covered and assembled with an outer cap C which defines an assembly space C1 inside for assembling with the rod head B3. The assembly space C1 includes a sliding hole C2 formed at a side thereof to cover the position-limiting ring A2, and the sliding hole C2 is formed with two opposite long protrusion rods C21 and two short protrusion rods C22 disposed on an inside wall thereof, and the two short protrusion rods C22 are separately disposed between the two long protrusion rods C21. The long protrusion rods C21 and the short protrusion rods C22 are respectively aligned and engaged with the grooves A21 on an outer edge of the position-limiting ring A2. The outer cap C includes a pulling part C3 protruded at an outer surface of a top thereof and in sharp-corner shape, and an indication part C4 labeled with open and close icons and disposed at an upper surface thereof. After the sleeve A is positioned on a predetermined plate to be fastened (not shown in FIGS. 9 and 10), the outer cap C can be rotated to drive the rotary rod B1 of the rotary knob device B to longitudinally move along the through hole A1 of the sleeve A, so as to insert the rotation pin B2 of the rotary knob device B through a hole of the predetermined plate (not shown in FIGS. 9 and 10); next, the pulling part C3 of the outer cap C can be pushed to rotate the outer cap C clockwise or counter-clockwise by 90 degrees, thereby rotating the rotation pin B2 to engage with a bottom surface of the predetermined plate. As a result, the user can integrally fasten the predetermined positioning plate and the predetermined fixed plate by hand.

However, the two first ring edges A22 and the two second ring edges A23 of the position-limiting ring A2 of the sleeve A are arranged in an interlaced arrangement, and the two long protrusion rods C21 and the two short protrusion rods C22 formed on the inside wall of the sliding hole C2 of the outer cap C are respectively arranged opposite to each other, so when the outer cap C is pressed down to rotate, the two long protrusion rods C21 of the outer cap C can be rotated only towards the two second ring edges A23 with smaller outer diameter, so that the outer cap C can be used by reciprocating rotation thereof in only single direction (clockwise or counter-clockwise) at both locked and unlocked states. The user can rotate the rotary knob device B by 90 degrees to unlock or lock the fastening device with the plates, this is the reason that, by rotating the rotary knob device B, the user cannot determine whether the rotary knob device B is in the locked state or the unlocked state after the rotation pin B2 of the rotary knob device B is fastened with the predetermined fixed plate, and it may affect entire detachment operation time and fluency. Besides that, usage of the conventional fastening device takes a longer time and is inconvenient, and the outer cap C also must be processed to form the indication part C4 on the upper surface thereof, to make the user understand the direction for locking and unlocking the fastening device, which may cause more cost due to the processing operation.

Furthermore, the general fastening devices are usually used in chassis of telecommunications cabinet, industrial computer, machine tool, server and so on, and the user is not easy to see and recognize the indication part C4 of the outer cap C of the conventional fastening device under the dark environment inside the chassis, so the user can determine whether the fastening device is in locked or unlocked state by only operation feeling, but the feelings of operating the fastening device in the locked state and the unlocked state are the same, which causes inconvenience in use.

Therefore, what is need is to develop a fastening device to solve aforementioned problems.

SUMMARY OF THE INVENTION

An objective of the present disclosure is to provide a fastening device including a sleeve, a rotary knob device and a drive cap. The sleeve is formed with a through-hole inside, and the through-hole defines a rotation space having a larger diameter at a side thereof, a fastening part is formed on an outer side of the sleeve corresponding in position to the rotation space, and a position-limiting ring is formed on other side of the sleeve opposite to the fastening part and has a larger diameter, and the position-limiting ring comprises a first position-limiting fastening groove, two second position-limiting fastening grooves formed at two opposite sides of the first position-limiting fastening groove, and a protrusion ring formed between the two second position-limiting fastening grooves and having an extended outer diameter, and the first position-limiting fastening groove, the two second position-limiting fastening grooves and the protrusion ring are formed on a periphery of the position-limiting ring. The rotary knob device includes a rod head disposed above the sleeve and a fastening member downwardly extended from a bottom surface of the rod head and inserted through the through hole, the fastening member comprises a rod, and a fastening part formed at a lower part of the rod and movably disposed in the rotation space, and the rotary knob device includes an elastic member mounted outside the fastening member and elastically abutted with the bottom surface of the rod head and an inner wall of the through-hole. The rod head of the rotary knob device is assembled in an assembly space of the drive cap, and the assembly space is formed with a sliding inner hole for covering the position-limiting ring of the sleeve, and the position-limiting ring is longitudinally movable in the sliding inner hole, and the sliding inner hole is formed with a long protrusion rod and two short protrusion rods disposed on a sidewall thereof and configured to align and engage with a first position-limiting fastening groove and two second position-limiting fastening grooves of the position-limiting ring. When the drive cap is pressed for locking, the drive cap can be bi-directionally rotated axially, and after the rotary knob device is locked, the protrusion ring blocks the long protrusion rod formed on the inside wall of the sliding inner hole, so that the drive cap can only unidirectionally rotate back to perform unlocking process. As a result, the user can effortlessly recognize whether the rotary knob device is in the locked or unlocked state according to hand feeling of operating the drive cap, thereby achieve purpose of intuitional, simple and quick operation, and improving convenience in installation or detachment.

Another objective of the present disclosure is that the long protrusion rod and the two short protrusion rods formed in the sliding inner hole of the drive cap are respectively longitudinally movable along the first position-limiting fastening groove and the two second position-limiting fastening grooves of the position-limiting ring of the sleeve, and the drive cap can drive the fastening part at an end of fastening member of the rotary knob device to longitudinally move into or out of the rotation space of the sleeve, so that the user can simply and easily operate the fastening device to lock or unlock the predetermined first plate and second plate without using any hand tools, thereby achieving the purpose of time and effort saving.

Another objective of the present disclosure is that, before the drive cap is pressed down, the protrusion ring of the position-limiting ring can block the two short protrusion rods formed on the inside wall of the sliding inner hole, to prevent the drive cap from axially rotating, so that the fastening part at the end of the fastening member can reliably pass through the through hole of the second plate; and, after the drive cap is pressed down to rotate, the protrusion ring can block the long protrusion rod formed on the inside wall of the sliding inner hole, and the drive cap can only be rotated back in the reverse direction, thereby achieving the purpose of improving usage fluency.

Another purpose of the present disclosure is that a length of the fastening member is higher than that of the sleeve, and when the fastening member of the rotary knob device is driven by the drive cap to longitudinally move, the fastening part of the fastening member is extended out of the sleeve, and at this time, if the second plate is not placed under the first plate, the fastening part of the fastening member is retrieved into the sleeve subject to the recovery action of the elastic member, so that the fastening device is not locked with the first plate. As a result, the user can know whether the second plate to be locked is placed under the first plate according to the hand feeling in operation, thereby providing nice anti-mistaking effect and achieving the purpose of improving assembly reliability.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Please refer to FIGS. 1 through 4, which respectively show an elevational view of the fastening device of the present disclosure, an exploded view of the fastening device of the present disclosure, and an exploded view and sectional side view of the fastening device of the present disclosure when viewed from another angle. As shown in FIGS. 1 through 4, the fastening device of the present disclosure includes a sleeve 1, a rotary knob device 2 and a drive cap 3.

The sleeve 1 is in a hollow shape and formed with a through-hole 10 inside, and the through-hole 10 defines a rotation space 11 having a larger diameter and formed at a side thereof. An axle hole 12 having a reduced diameter is formed between the through-hole 10 and the rotation space 11. An abutting shoulder part 101 is formed in the through-hole 10 adjacent to the axle hole 12, and a stop surface Ill is formed inside the rotation space 11 adjacent to the axle hole 12. The sleeve 1 is formed with a fastening part 13 at a side thereof and corresponding in position to an outside of the rotation space 11, and a position-limiting ring 14 disposed at other side thereof opposite to the fastening part 13. The position-limiting ring 14 has an outer diameter larger than that of the fastening part 13. The position-limiting ring 14 includes a first position-limiting fastening groove 141 formed on a periphery thereof and two second position-limiting fastening grooves 142 formed at two sides of the first position-limiting fastening groove 141, and a protrusion ring 143 formed between the two second position-limiting fastening grooves 142 and having an extended outer diameter.

The rotary knob device 2 includes a rod head 21, a fastening member 22 and an elastic member 23. The rod head 21 may include an annular engaging part 211 protruded on an outer surface of a periphery thereof and a joint hole 210 cut through a central part thereof. A connecting part 221 of the fastening member 22, which is at a top part of the fastening member 22 and has embossed pattern, is fixed in the joint hole 210. A rod 222 is extended from a lower part of the connecting part 221, and a fastening part 223 is formed at a bottom part of the rod 222, and a plurality of stop blocks 2231 are outwardly protruded at two opposite sides of the fastening part 223. The elastic member 23 is mounted on the rod 222 of the fastening member 22.

The drive cap 3 is formed with an assembly space 30 in a hollow shape, a fastening recess 301 with a larger diameter is formed on an inner side of the assembly space 30, and a sliding inner hole 31 is formed adjacent to a side of the fastening recess 301 and axially cut therethrough outwardly. A long protrusion rod 311 is formed on an inside wall of the sliding inner hole 31, and two short protrusion rods 312 are separately formed on two opposite side of the long protrusion rods 311, and a rotation section 32 is formed inside the sliding inner hole 31, above the two short protrusion rods 312 and opposite to the long protrusion rod 311. The short protrusion rod 312 is shorter than the long protrusion rod 311. The drive cap 3 includes a holding part 33 disposed at an outer surface thereof and the holding part 33 includes a pushing part 331 which is in an elongate shape and disposed correspondingly in position outside the long protrusion rod 311.

In order to assemble the aforementioned members, the fastening member 22 of the rotary knob device 2 is movably inserted through the through-hole 10 and the axle hole 12 of the sleeve 1, and the stop blocks 2231 of the fastening part 223 at an end of the fastening member 22 can be abutted against the stop surface Ill on inner side of the rotation space 11, so as to prevent the fastening member 22 from departing out of the through hole 10 and the axle hole 12 of the sleeve 1, and to make the fastening part 223 of the fastening member 22 longitudinally movable inside the rotation space 11. The rod head 21 at other end of the fastening member 22 may be exposed out of the through-hole 10 of the sleeve 1 upwardly. The elastic member 23 mounted on the rod 222 of the fastening member 22 is stopped against the abutting shoulder part 101 of the through hole 10 and a bottom surface of the rod head 21 of the rotary knob device 2; next, and the annular engaging part 211 of the rod head 21 may be assembled with the fastening recess 301 of at a side of the assembly space 30 of the drive cap 3, so that the position-limiting ring 14 of the sleeve 1 is movably mounted by the sliding inner hole 31 at other side of the assembly space 30. The long protrusion rod 311 and two short protrusion rods 312 at the inside wall of the sliding inner hole 31 are respectively aligned with and constrained in the first position-limiting fastening groove 141 and the two second position-limiting fastening grooves 142, respectively. The two short protrusion rods 312 are blocked, by the protrusion ring 143 of the position-limiting ring 14, from being rotate axially. According to aforementioned operations, the sleeve 1, the rotary knob device 2 and the drive cap 3 are assembled to form the fastening device of the present disclosure.

The position-limiting ring 14 at the end of the sleeve 1 may include the first position-limiting fastening groove 141 at the periphery thereof, and the second position-limiting fastening grooves 142 respectively formed at two opposite sides of the first position-limiting fastening groove 141. In this embodiment, based on the first position-limiting fastening groove 141, the two second position-limiting fastening grooves 142 are respectively disposed adjacent to the first position-limiting fastening groove 141 by a 90-degree angle, and the protrusion ring 143 formed between the two second position-limiting fastening grooves 142 is disposed at the remaining 180-degree area opposite to the first position-limiting fastening groove 141.

Furthermore, the sliding inner hole 31 of the drive cap 3 is formed with the long protrusion rod 311 disposed on the inside wall thereof, and the two short protrusion rods 312 are disposed at two opposite sides of the long protrusion rod 311 and spaced from the long protrusion rod 311 by 90-degree angle. The short protrusion rod 312 is shorter than the long protrusion rod 311. The rotation section 32 is about 180 degrees and formed above the two short protrusion rods 312 and opposite to the long protrusion rod 311. The difference between heights of the long protrusion rod 311 and the short protrusion rod 312 is higher than or equal to a thickness of the position-limiting ring 14 of the sleeve 1, so that the two short protrusion rods 312 may be released from being constrained by the two second position-limiting fastening grooves 142 of the position-limiting ring 14 after the drive cap 3 is pressed.

Figure 1:
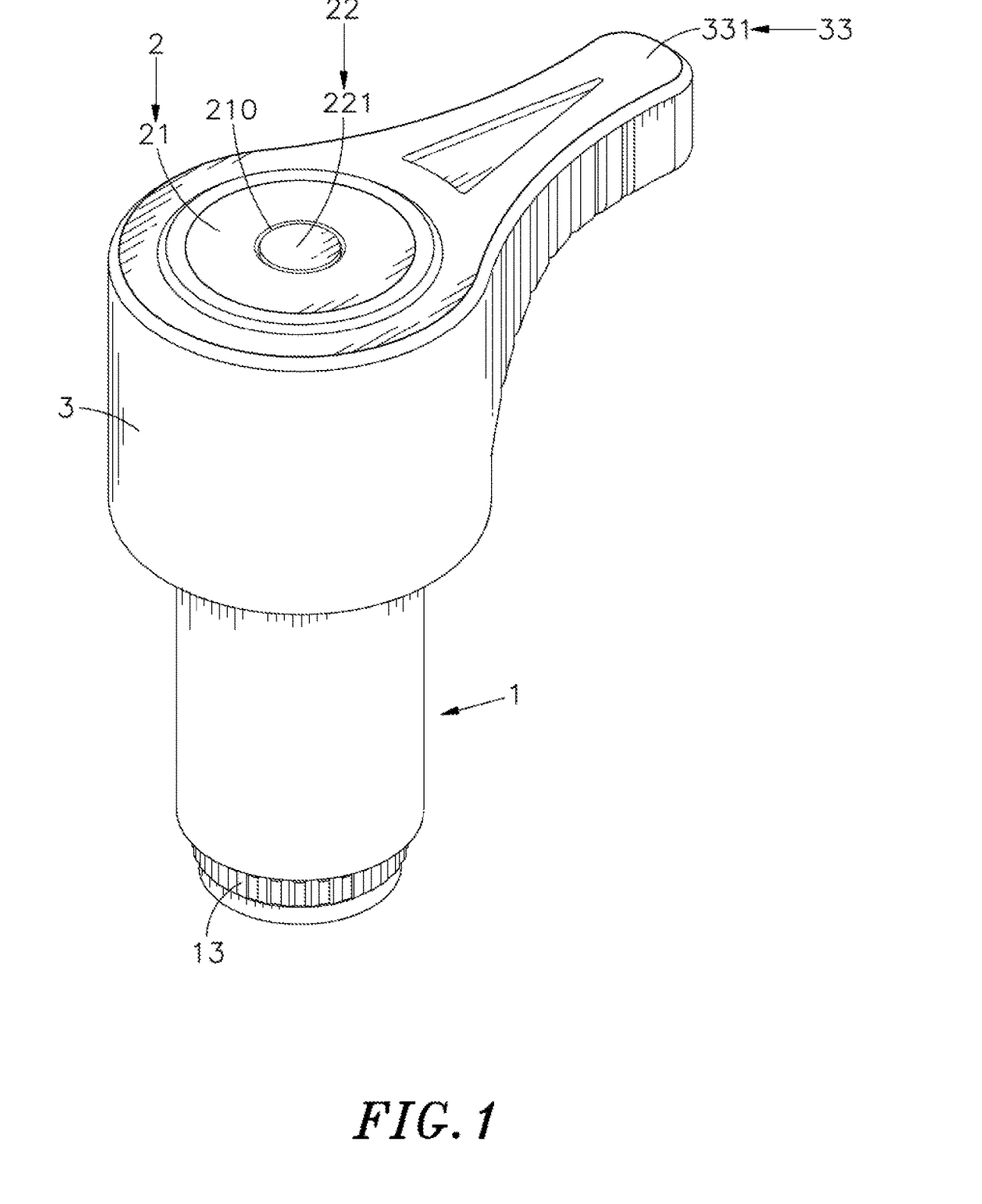
FIG. 1 is an elevational view of a fastening device of the present disclosure.
Figure 2:
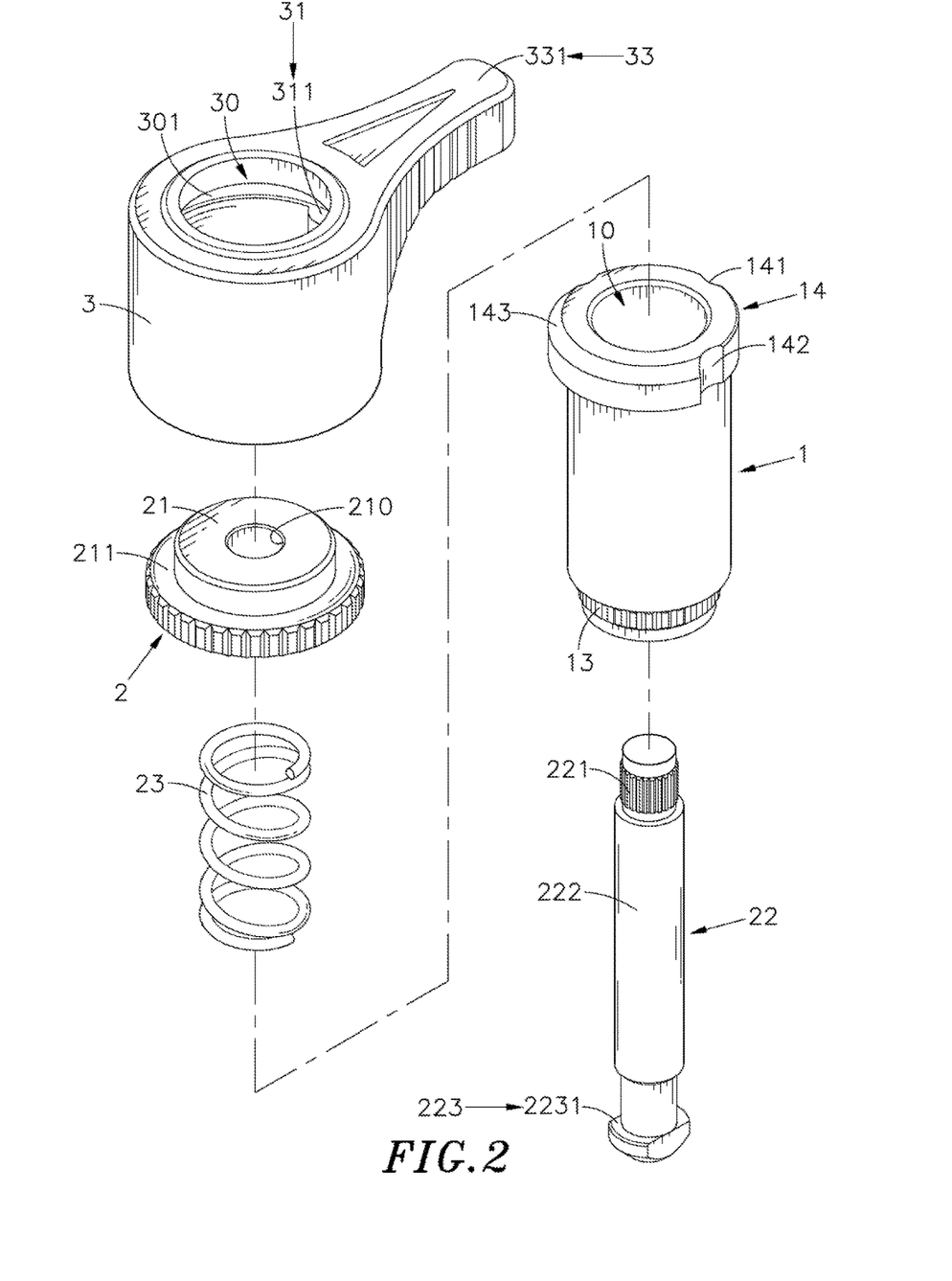
FIG. 2 is an exploded view of the fastening device of the present disclosure.
Figure 3:
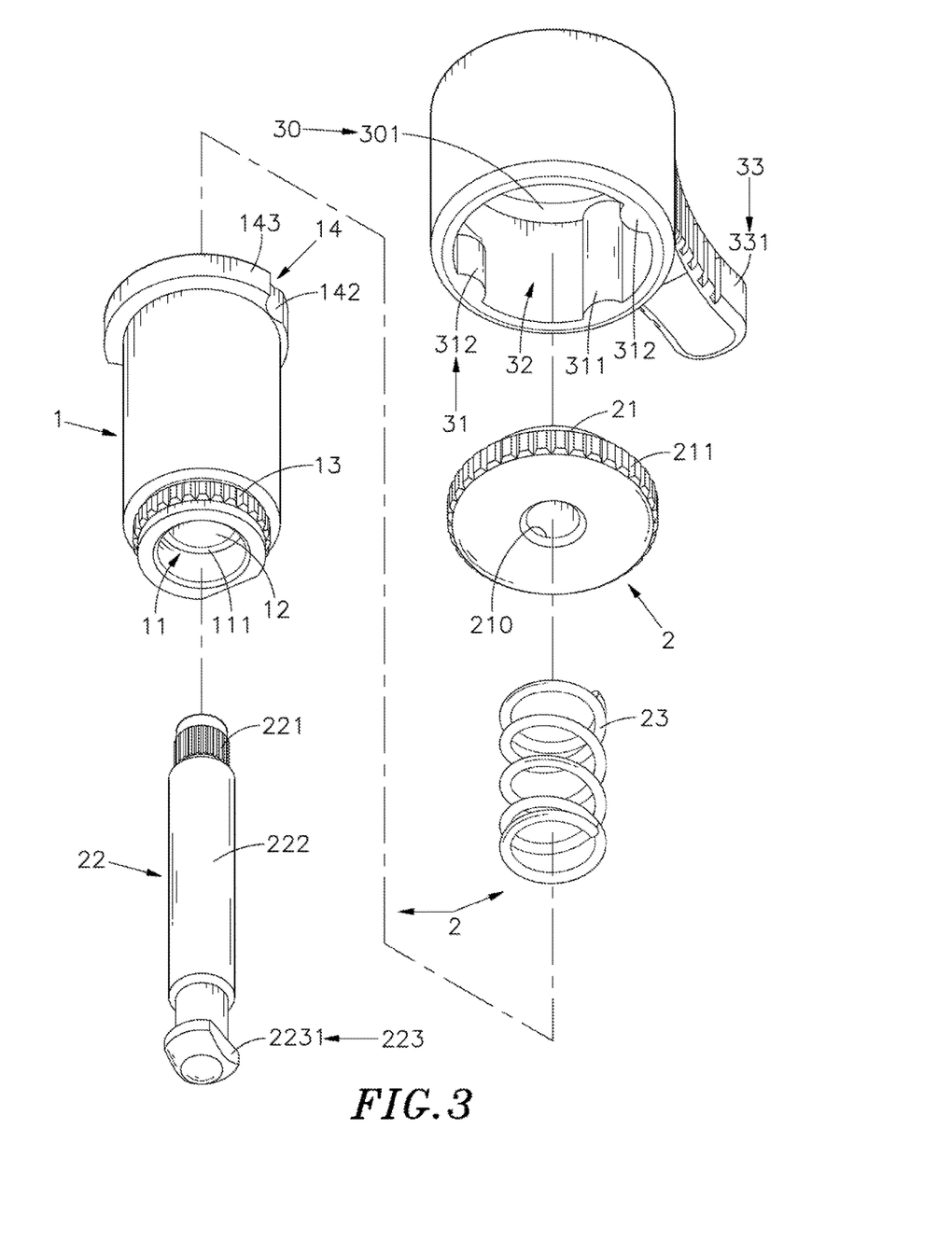
FIG. 3 is an exploded view of the fastening device of the present disclosure, when viewed from another angle.
Figure 4:
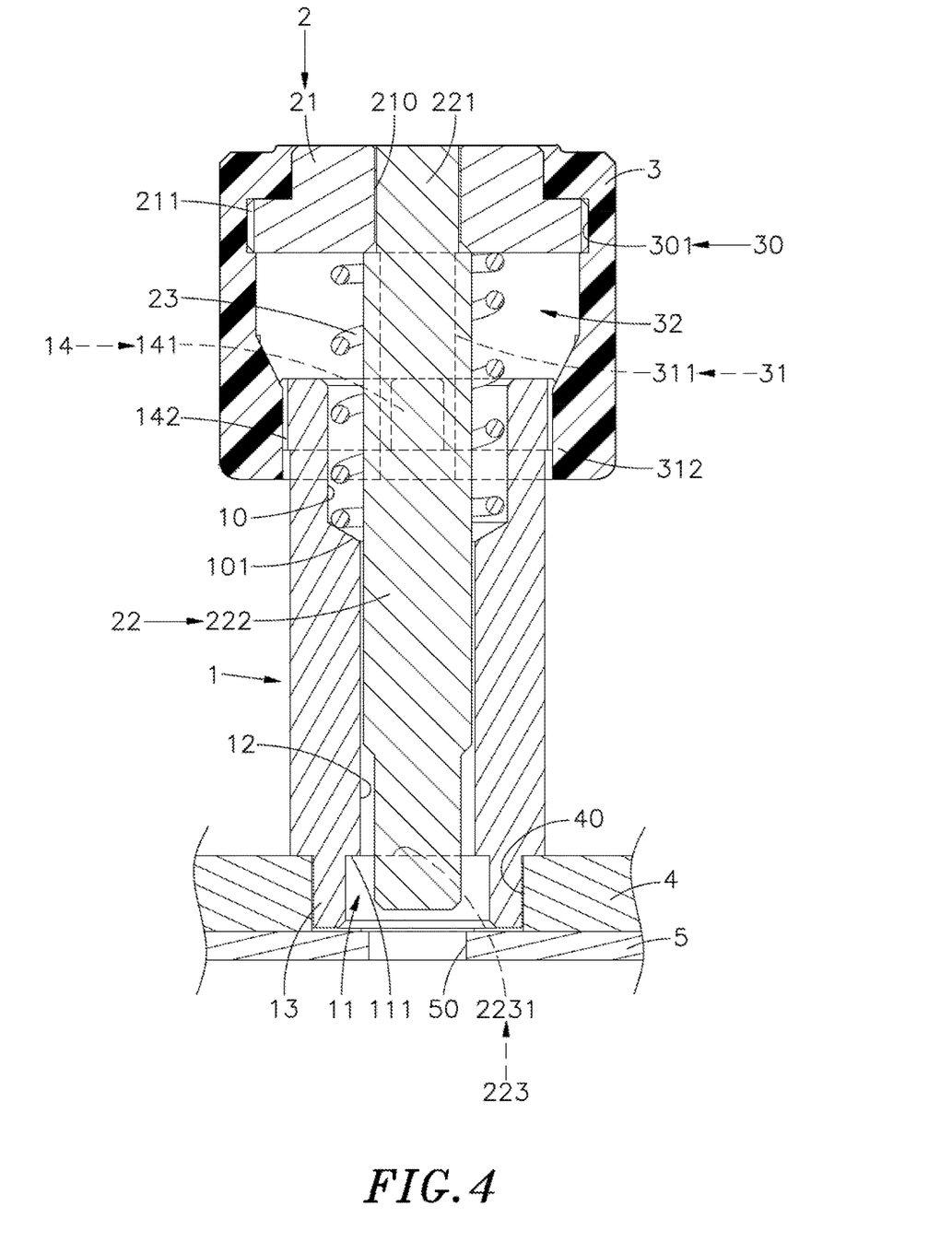
FIG. 4 is a sectional side view of the fastening device of the present disclosure.
Figure 5:
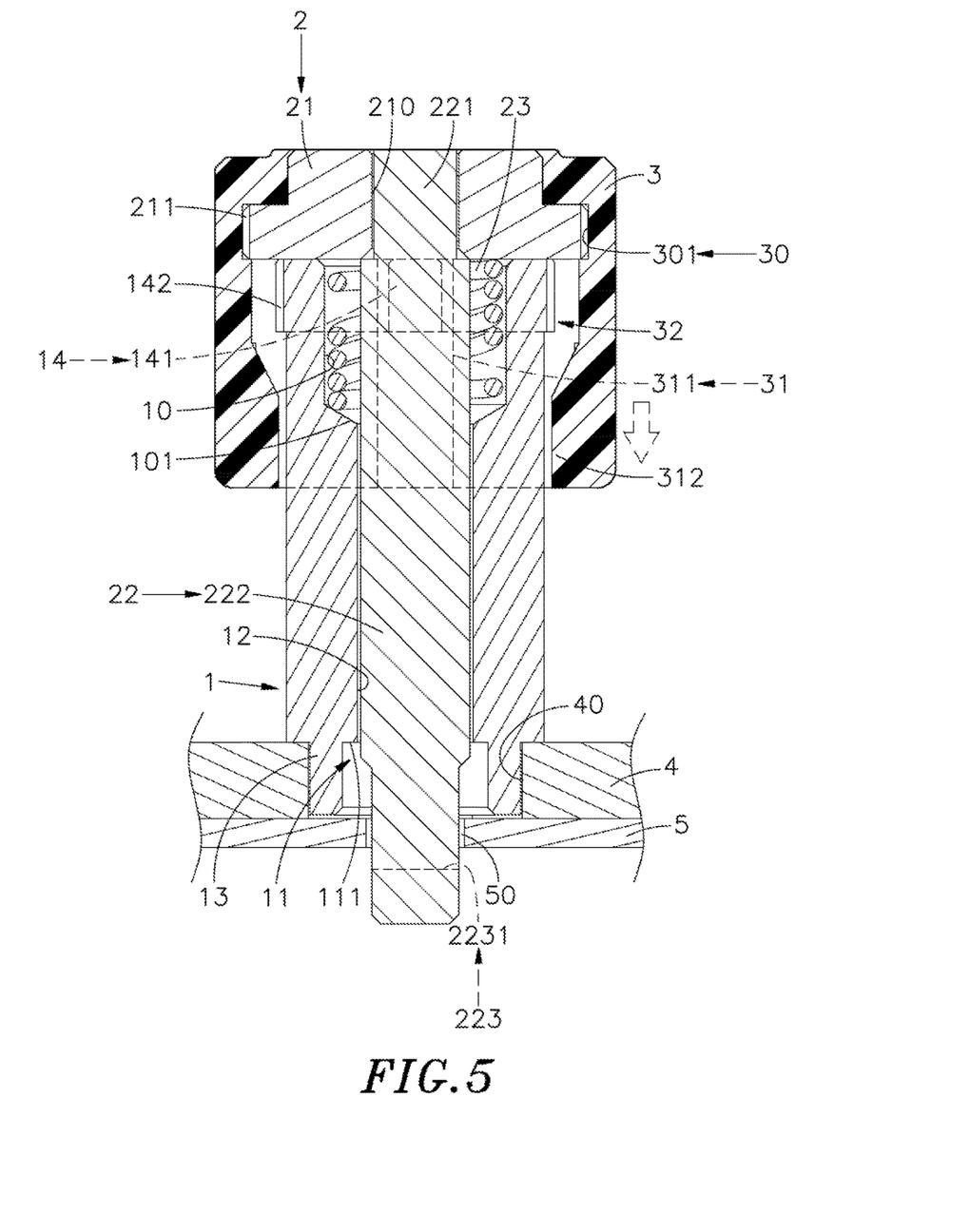
FIG. 5 is a sectional side view of an operation of the fastening device of the present disclosure.
Figure 6A:
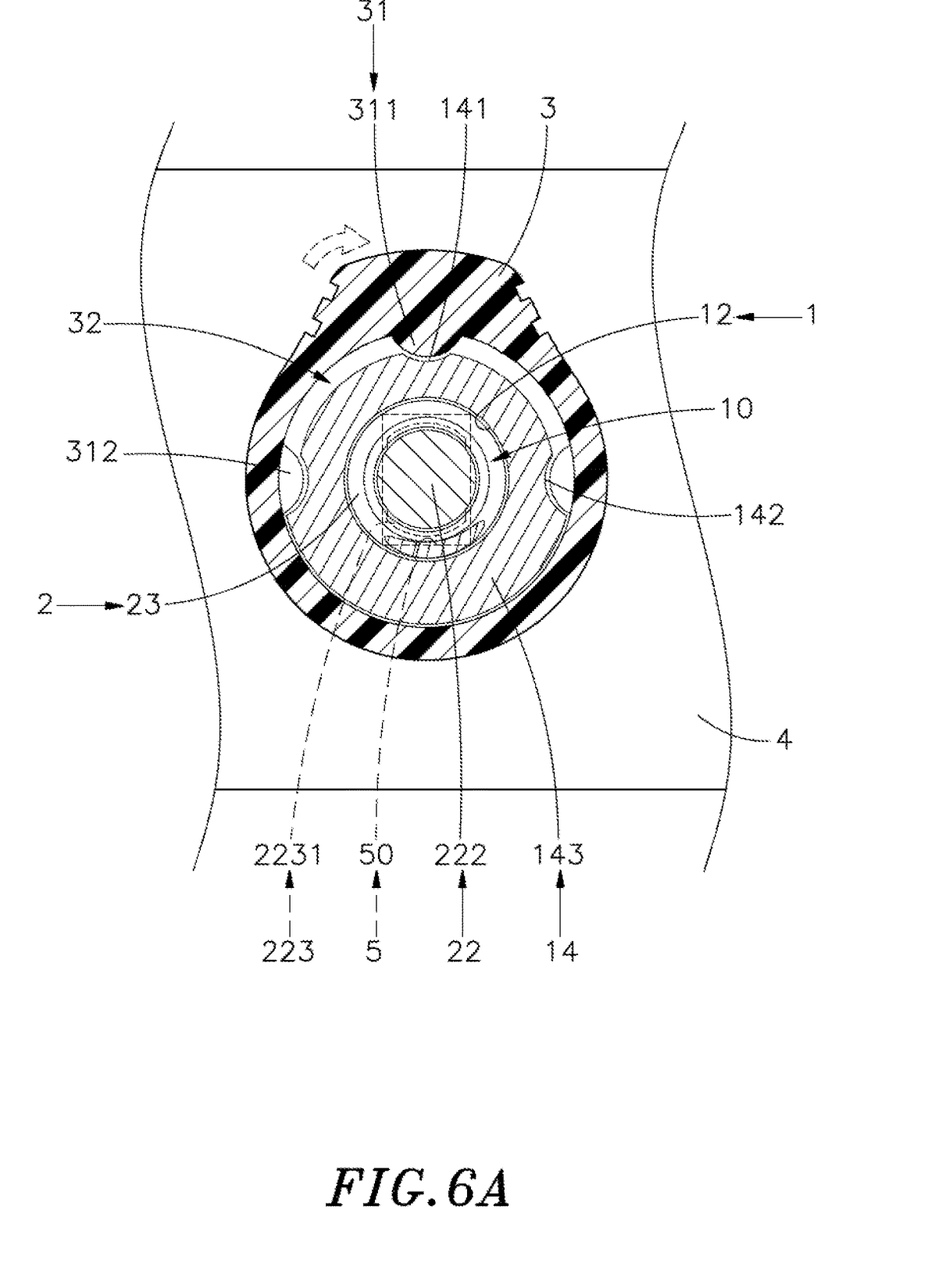
FIG. 6A is a top sectional view of a drive cap of the fastening device of the present disclosure, before the drive cap is rotated.
Figure 6B:
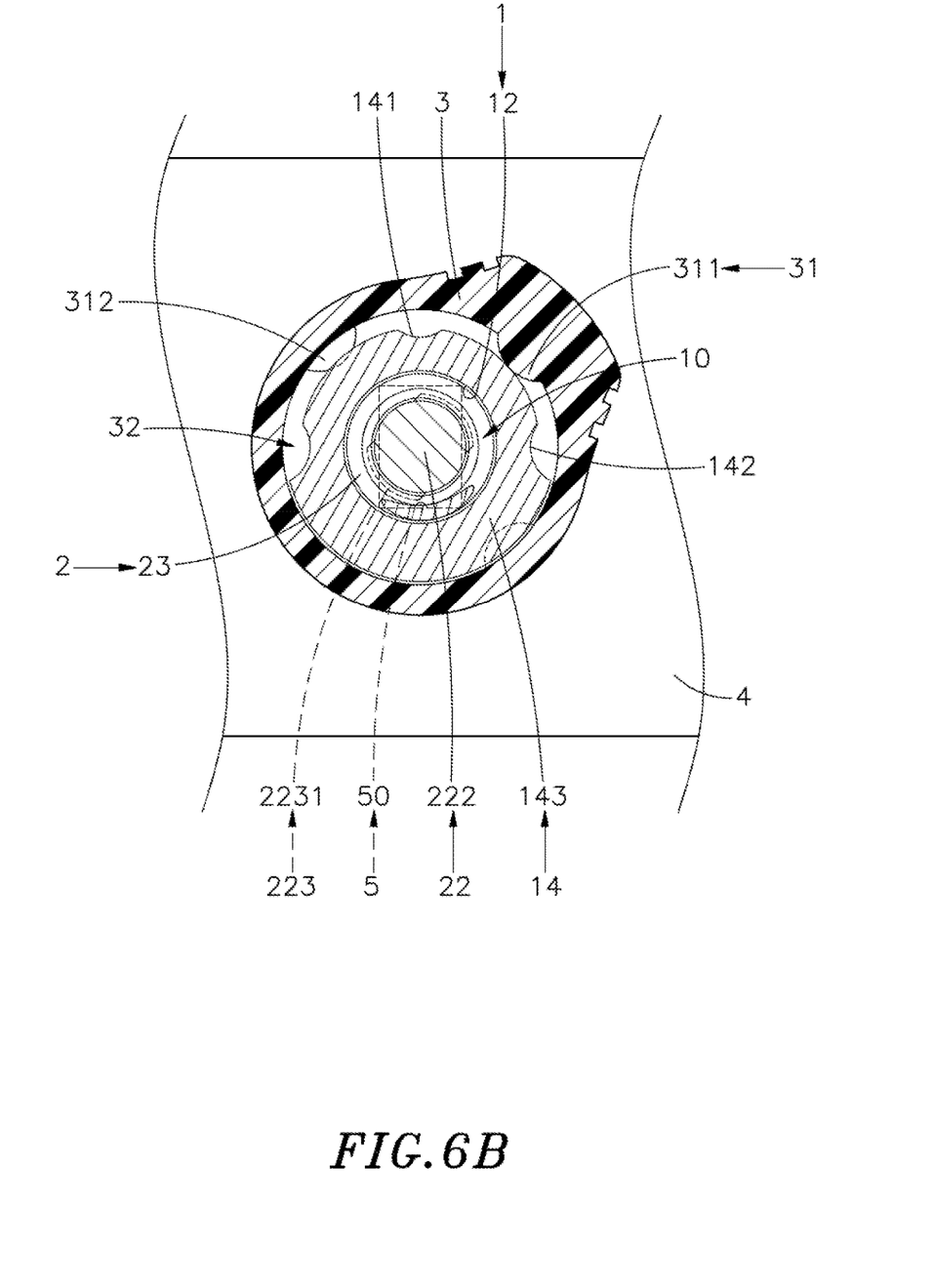
FIG. 6B is a top sectional view of the drive cap of the fastening device of the present disclosure, while the drive cap is being rotated.
Figure 6C:
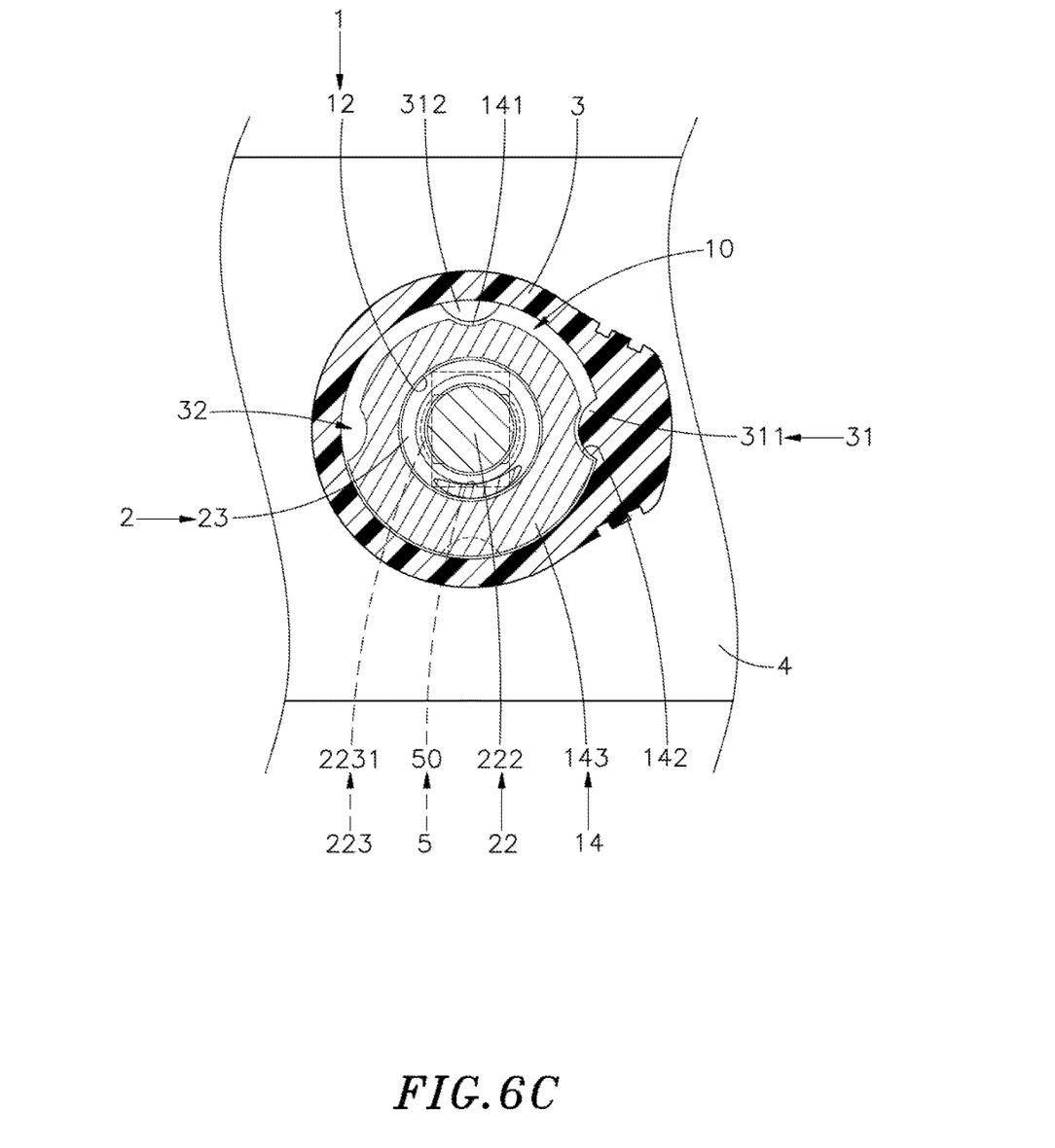
FIG. 6C is a top sectional view of the drive cap of the fastening device of the present disclosure, after the drive cap is rotated already.
Figure 7:
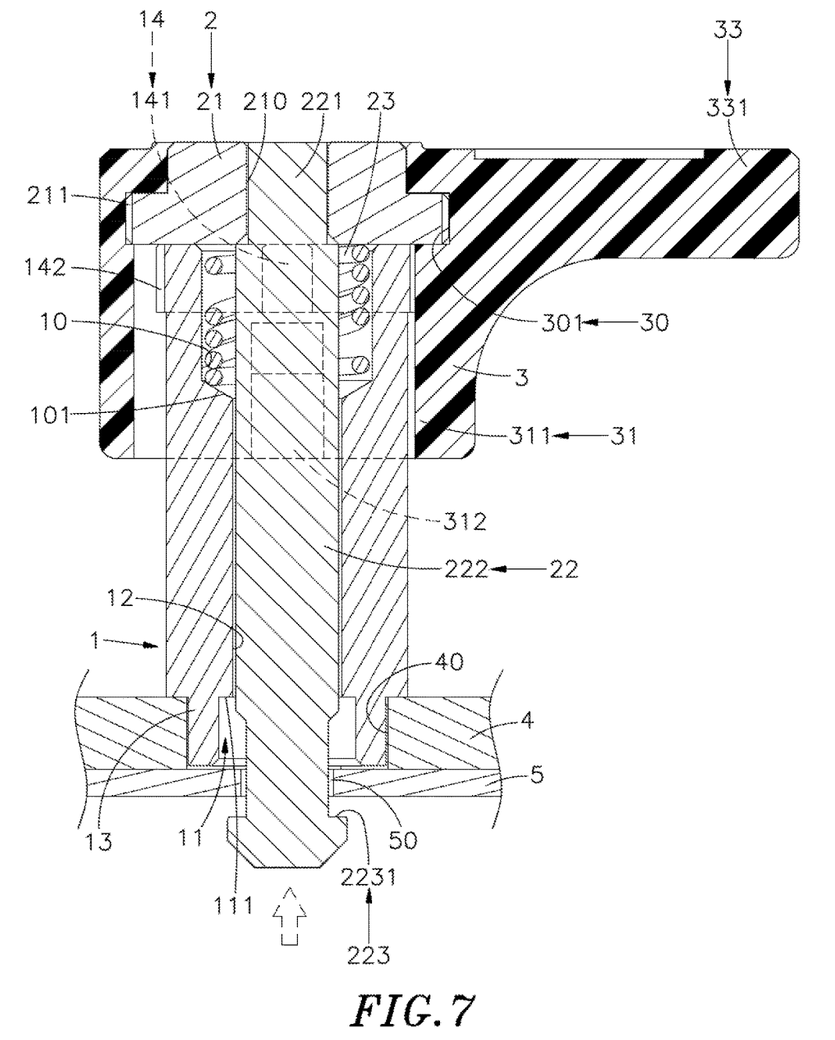
FIG. 7 is a sectional side view of an operation of the fastening device of the present disclosure, when viewed from another angle.
Figure 8:
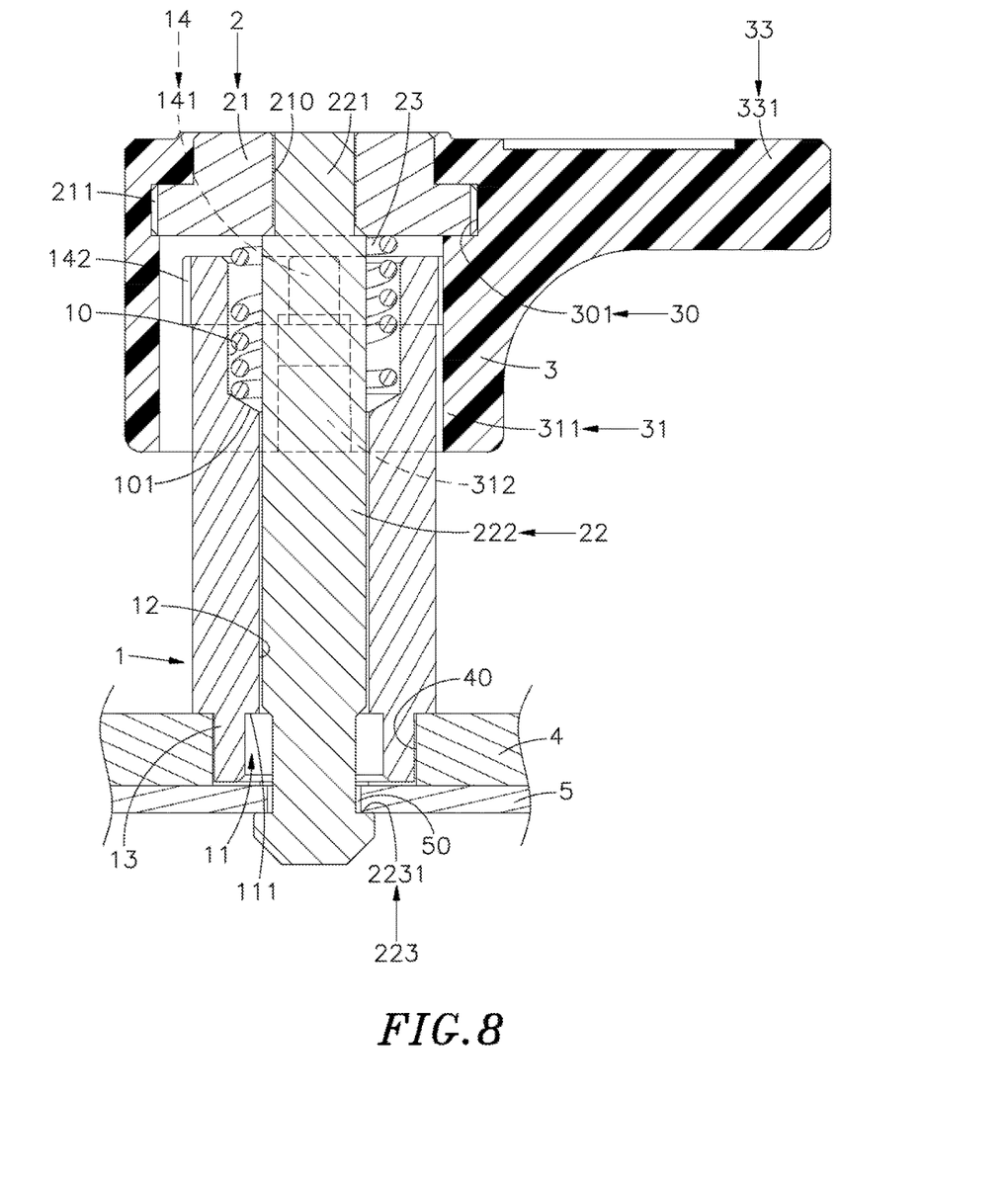
FIG. 8 is sectional side view of the fastening device of the present disclosure, when the fastening device is operated already and viewed from another angle.

The following refers to FIGS. 2, 4, 5, 6A, 6B, 6C. 7 and 8. FIG. 2 is an exploded view of the fastening device of the present disclosure; FIG. 4 is a sectional side view of the fastening device of the present disclosure; FIG. 5 is a sectional side view of an operation of the fastening device of the present disclosure; FIG. 6A is a top sectional view of a drive cap of the fastening device of the present disclosure, before the drive cap is rotated; FIG. 6B is a top sectional view of the drive cap of the fastening device of the present disclosure, while the drive cap is being rotated; FIG. 6C is a top sectional view of the drive cap of the fastening device of the present disclosure, after the drive cap is rotated already, FIG. 7 is a sectional side view of an operation of the fastening device of the present disclosure, when viewed from another angle; and FIG. 8 is sectional side view of the fastening device of the present disclosure, when the fastening device is operated already and viewed from another angle. The fastening device of the present disclosure may be assembled into a fixing hole 40 of a first plate 4 by the fastening part 13 disposed at outside surface of the sleeve 1, and further combined with a second plate 5 under the first plate 4. The second plate 5 includes a through hole 50 cut therethrough, in a long rectangular shape, and aligned with and under the fixing hole 40 and the sleeve 1; at this time, when a force is applied on a surface of the drive cap 3 above the sleeve 1, the drive cap 3 may be longitudinally pressed down to drive the fastening member 22 of the rotary knob device 2 to move longitudinally along the through hole 10 and the axle hole 12, and the elastic member 23 mounted on the fastening member 22 is then compressed by the bottom surface of the rod head 21 of the rotary knob device 2. At this time, the fastening part 223 at the bottom of the fastening member 22 is moved out of the rotation space 11 of the sleeve 1 to extend out of the bottom portion of the through hole 50 of the second plate 5. At the same time, the two short protrusion rods 312 on the inside wall of the sliding inner hole 31 of the drive cap 3 are downwardly moved correspondingly, so as to release from being constrained by the two second position-limiting fastening grooves 142 on the surface of the position-limiting ring 14, and the position-limiting ring 14 then enters the rotation section 32 formed above the two short protrusion rods 312 and opposite to the long protrusion rod 311. Next, the pushing part 331 of the holding part 33 may be pushed to rotate, so that the long protrusion rod 311 may be bi-directionally rotated, counter-clockwise or clockwise, along an outer edge of the position-limiting ring 14, for example, the long protrusion rod 311 may be rotated by about 90 degrees, as shown in FIGS. 6A and 6B; at the same time, the stop blocks 2231 at two sides of the fastening part 223 are driven to axially rotate and then fastened in the through hole 50 of the second plate 5 in a perpendicularly-staggered way, as shown in FIG. 6C, so that the stop blocks 2231 of the fastening part 223 is laterally fastened in the bottom of the through-hole 50. As a result, the second plate 5 may be fastened under the bottom of the first plate 4, and they are locked and combined stably, and it is not easy to loosen or separate the combination of the second plate 5 and the first plate 4.

In order to separate the second plate 5 from the first plate 4, the holding part 33 of the drive cap 3 may be rotated again. The long protrusion rod 311 of the sliding inner hole 31 is blocked by the protrusion ring 143 of the position-limiting ring 14, so the drive cap 3 may only be unidirectionally rotated in a direction opposite to the direction used in combination of the first plate 4 and the second plate 5, by about 90 degrees, thereby rotating the fastening part 223 of the fastening member 22 back to align the plurality of stop blocks 2231 of the fastening part 223 in parallel with the rectangular-shaped through hole 50 of the second plate 5, as shown in FIG. 6A. At this time, the long protrusion rod 311 of the drive cap 3 is upwardly moved longitudinally along the position-limiting fastening grooves 141 of the position-limiting ring 14 of the sleeve 1 under assistance of the elastic force of the elastic member 23, so that the position-limiting ring 14 is separated from the rotation section 32 of the drive cap 3. The long protrusion rod 311 and the two short protrusion rods 312 are respectively engaged with the first position-limiting fastening groove 141 and two second position-limiting fastening grooves 142 of the position-limiting ring 14 again, and the elastic member 23 is also kept being abutted against the bottom surface of the rod head 21 of the rotary knob device 2, so that the fastening member 22 is longitudinally moved upwardly along the through hole 10 and the axle hole 12, and after the fastening part 223 at the end of the fastening member 22 passes through the through hole 50 of the second plate 5 to enter the rotation space 11 at the lower portion of the sleeve 1, the stop blocks 2231 of the fastening part 223 may be abutted with the stop surface 111 on the inner side of the rotation space 11 again. As a result, the second plate 5 is released from being locked by the fastening device of the present disclosure, and the second plate 5 and the first plate 4 may be separated from each other. By the manner of rotating the drive cap 3 disposed above the sleeve 1 to longitudinally move the rotary knob device 2 along the through hole 10 and the axle hole 12 of the sleeve 1, the user may simply and easily combine (lock) the first plate 4 and the second plate 5, or separate (unlock) the first plate 4 and the second plate 5 from each other without using any hand tools, and the fastening device of the present disclosure can achieve the effect of saving time and effort.

While being pressed for locking, the drive cap 3 may be rotated bi-directionally; in order to unlock the fastening device, the drive cap 3 may only be unidirectionally rotated back, so that the user may have obviously different hand feeling in operation, that is, the user can recognize a locked state or an unlocked state of the rotary knob device 2 by checking whether the drive cap 3 can be rotated bi-directionally in clockwise and counter-clockwise direction. As a result, the user can intuitionally, simply and quickly operate the fastening device of the present disclosure, to conveniently and smoothly install or uninstall the fastening device.

Furthermore, the position-limiting ring 14 of the sleeve 1 includes a protrusion ring 143 formed between the two second position-limiting fastening grooves 142 thereof and having an extended outer diameter. The protrusion ring 143 can block the two short protrusion rods 312 at the inside wall of the sliding inner hole 31 before the drive cap 3 is pressed down, so as to prevent axial rotation of the drive cap 3 and enable the fastening part 223 at the end of the fastening member 22 to reliably pass through the through hole 50 of the second plate 5. After the drive cap 3 is pressed down to rotate, the protrusion ring 143 can block the long protrusion rod 311 at the inside wall of the sliding inner hole 31, so that the drive cap 3 can only be rotated back. As a result, the protrusion ring 143 can provide nice anti-mistaking effect to improve the usage fluency of the fastening device of the present disclosure.

Furthermore, a length of the fastening member 22 of the rotary knob device 2 is higher than that of the sleeve 1, so when the sleeve 1 is fastened in the first plate 4 and the fastening member 22 is driven by the drive cap 3 to move longitudinally, the fastening part 223 at the end of the fastening member 22 may be extended out of the sleeve 1.

At this time, if there is no second plate 5 disposed under the first plate 4, the fastening part 223 of the fastening member 22 may be moved into the sleeve 1 subject to the recovery action of the elastic member 23, so that the fastening device may not be engaged with the first plate 4. According to the hand feeling in operating the fastening device, the user may determine whether the second plate 5 to be locked is disposed under the first plate 4; as a result, the fastening device of the present disclosure can provide nice anti-mistaking effect and improve reliability of assembling operation.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A fastening device, comprising a sleeve, a rotary knob device and a drive cap, wherein:

said sleeve is in a hollow shape and formed with a through-hole inside, and said through-hole defines a rotation space having a larger diameter at a side thereof, a fastening part is formed on an outer side of said sleeve corresponding in position to said rotation space, said fastening part is assembled into a fixing hole of a first plate, and a position-limiting ring is formed on other side of said sleeve opposite to said fastening part and has a larger diameter, and said position-limiting ring comprises a first position-limiting fastening groove, two second position-limiting fastening grooves formed at two opposite sides of said first position-limiting fastening groove, and a protrusion ring formed between said two second position-limiting fastening grooves and having an extended outer diameter, and said first position-limiting fastening groove, said two second position-limiting fastening grooves and said protrusion ring are formed on a periphery of said position-limiting ring;

wherein said rotary knob device is movably assembled in said through-hole of said sleeve and comprises a rod head disposed above said sleeve and a fastening member downwardly extended from a bottom surface of said rod head and inserted through said through hole, said fastening member comprises a rod, and a fastening part formed at a lower part of said rod and movably disposed in said rotation space, and said rotary knob device comprises an elastic member mounted outside said fastening member and elastically abutted with said bottom surface of said rod head and an inner wall of said through-hole;

wherein said drive cap is assembled with exterior of said rotary knob device and comprises an assembly space inside for assembling with said rod head of said rotary knob device, and said assembly space is formed with a sliding inner hole for covering said position-limiting ring of said sleeve, and said position-limiting ring is longitudinally movable in said sliding inner hole, and said sliding inner hole comprises a long protrusion rod formed on a sidewall thereof and configured to align and engage with said first position-limiting fastening groove of said position-limiting ring, and two short protrusion rods formed on two opposite sides of said long protrusion rod, having relatively-shorter lengths and configured to align and engage with said two second position-limiting fastening grooves, and said sliding inner hole comprises a rotation section formed above said two short protrusion rods, opposite to said long protrusion rod and configured for reciprocating rotation of an outer edge of said position-limiting ring;

wherein before said drive cap is pressed down, said protrusion ring is blocked by said two short protrusion rods, and after said drive cap is pressed down to rotate, said fastening part of said fastening member is rotated to engage with a through hole of a predetermined second plate and said protrusion ring is blocked by said long protrusion rod.

2. The fastening device according to claim 1, wherein said sleeve is formed with an axle hole which is formed between said through-hole of said sleeve and said rotation space, said axle hole has a reduced diameter, said fastening member is inserted through said axle hole, an abutting shoulder part is formed in said through-hole adjacent to said axle hole and configured to abut with an end of said elastic member, and a stop surface is formed on an inner side of said rotation space adjacent to said axle hole and configured to block an upper surface of said fastening part of said fastening member.

3. The fastening device according to claim 1, wherein said two second position-limiting fastening grooves are separately arranged adjacent to said first position-limiting fastening groove with equal angles of 90 degrees on said position-limiting ring, and said protrusion ring formed between said two second position-limiting fastening grooves is arranged at said remaining 180-degree area opposite to said first position-limiting fastening groove, and said two short protrusion rods are separately arranged adjacent to two opposite sides of said long protrusion rod with equal angles of 90 degrees on said inside wall of said sliding inner hole, and each of said two short protrusion rods is shorter than said long protrusion rod.

4. The fastening device according to claim 1, wherein said rod head of said rotary knob device comprises an annular engaging part protruded on an outer surface of a periphery thereof, and said assembly space defines a fastening recess formed inside, having a larger hole diameter and configured to assemble and locate said annular engaging part.

5. The fastening device according to claim 1, wherein said rod head of said rotary knob device comprises a joint hole cut through a central part thereof, and said fastening member of said rotary knob device comprises a connecting part disposed on a side thereof opposite to said fastening part and configured to engage with said joint hole.

6. The fastening device according to claim 1, wherein said fastening part of said fastening member comprises a plurality of stop blocks outwardly protruded at two opposite sides thereof and configured to block a bottom surface of said through hole of said predetermined second plate.

7. The fastening device according to claim 1, wherein a height difference between said long protrusion rod and said two short protrusion rods of said sliding inner hole of said drive cap are higher than or equal to a thickness of said position-limiting ring of said sleeve.

8. The fastening device according to claim 1, wherein said drive cap comprises a holding part formed on an outer surface thereof, and said holding part comprises a pushing part formed at an outer surface thereof, correspondingly in position to said long protrusion rod, and in an elongate shape.

* * * * *